United States Patent
Yuki et al.

(10) Patent No.: US 9,900,089 B2
(45) Date of Patent: Feb. 20, 2018

(54) OPTICAL TRANSMISSION DEVICE AND METHOD FOR CHECKING OPTICAL CONNECTION IN OPTICAL TRANSMISSION DEVICE

(71) Applicant: FUJITSU LIMITED, Kawasaki-shi, Kanagawa (JP)

(72) Inventors: Masahiro Yuki, Kawasaki (JP); Yoshinobu Matsukawa, Kawasaki (JP); Atsushi Kiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/409,003

(22) Filed: Jan. 18, 2017

(65) Prior Publication Data
US 2017/0250752 A1 Aug. 31, 2017

(30) Foreign Application Priority Data
Feb. 29, 2016 (JP) ................................ 2016-037568

(51) Int. Cl.
*H04B 10/00* (2013.01)
*H04B 10/079* (2013.01)
*H04J 14/02* (2006.01)
*H04Q 11/00* (2006.01)

(52) U.S. Cl.
CPC .... *H04B 10/07955* (2013.01); *H04J 14/0212* (2013.01); *H04J 14/0221* (2013.01); *H04Q 11/0062* (2013.01); *H04Q 2011/0083* (2013.01)

(58) Field of Classification Search
USPC ....................................... 398/30–33
See application file for complete search history.

(56) References Cited

U.S. PATENT DOCUMENTS

| | | | | |
|---|---|---|---|---|
| 7,885,541 | B2* | 2/2011 | Look | H04B 10/07951 385/16 |
| 8,401,386 | B2* | 3/2013 | Izumi | H04J 14/02 398/33 |
| 8,422,890 | B2* | 4/2013 | Mimuro | H01S 3/067 398/195 |
| 8,687,964 | B2* | 4/2014 | Kumar | H04J 3/14 398/58 |
| 2002/0097460 | A1* | 7/2002 | Ikoma | H04B 10/00 398/9 |
| 2002/0131101 | A1* | 9/2002 | Ohira | H04B 10/0773 398/9 |

(Continued)

FOREIGN PATENT DOCUMENTS

| | | |
|---|---|---|
| JP | 2006-166478 | 6/2006 |
| JP | 2008-139073 | 6/2008 |
| JP | 2011-155612 | 8/2011 |

*Primary Examiner* — Agustin Bello
(74) *Attorney, Agent, or Firm* — Staas & Halsey LLP

(57) ABSTRACT

An optical transmission device that transmits an optical signal in a specified wavelength band includes: a receiver, a monitor light unit, a wavelength selective switch and a memory. The receiver receives the optical signal. The monitor light unit outputs monitor light of a wavelength allocated outside of the specified wavelength band. The wavelength selective switch outputs the optical signal via a first port and outputs the monitor light via a second port. The memory stores information that indicates an optical power loss of a route through which the monitor light is transmitted.

9 Claims, 13 Drawing Sheets

(56) References Cited

U.S. PATENT DOCUMENTS

| | | | | |
|---|---|---|---|---|
| 2003/0106990 A1* | 6/2003 | Tomofuji | ............ | H04B 10/2942 |
| | | | | 250/214 LA |
| 2004/0190899 A1* | 9/2004 | Torii | ................ | H04B 10/07953 |
| | | | | 398/33 |
| 2006/0120719 A1* | 6/2006 | Bradford | ................. | H04B 10/00 |
| | | | | 398/31 |
| 2008/0131116 A1* | 6/2008 | Nakamura | ........ | H04B 10/07955 |
| | | | | 398/34 |
| 2008/0267623 A1* | 10/2008 | Manifold | ............ | H04J 14/0226 |
| | | | | 398/33 |
| 2011/0182585 A1* | 7/2011 | Shoji | .................. | H04B 10/0797 |
| | | | | 398/83 |
| 2017/0250752 A1* | 8/2017 | Yuki | ................. | H04B 10/07955 |

\* cited by examiner

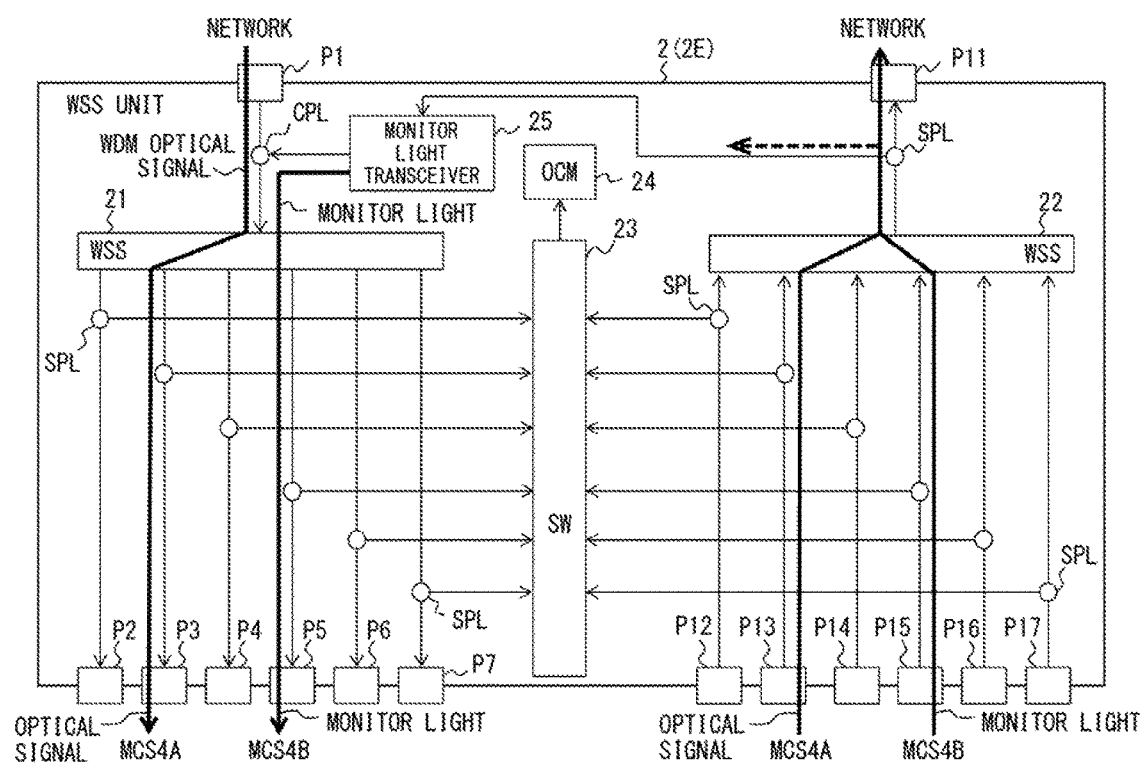
F I G. 4

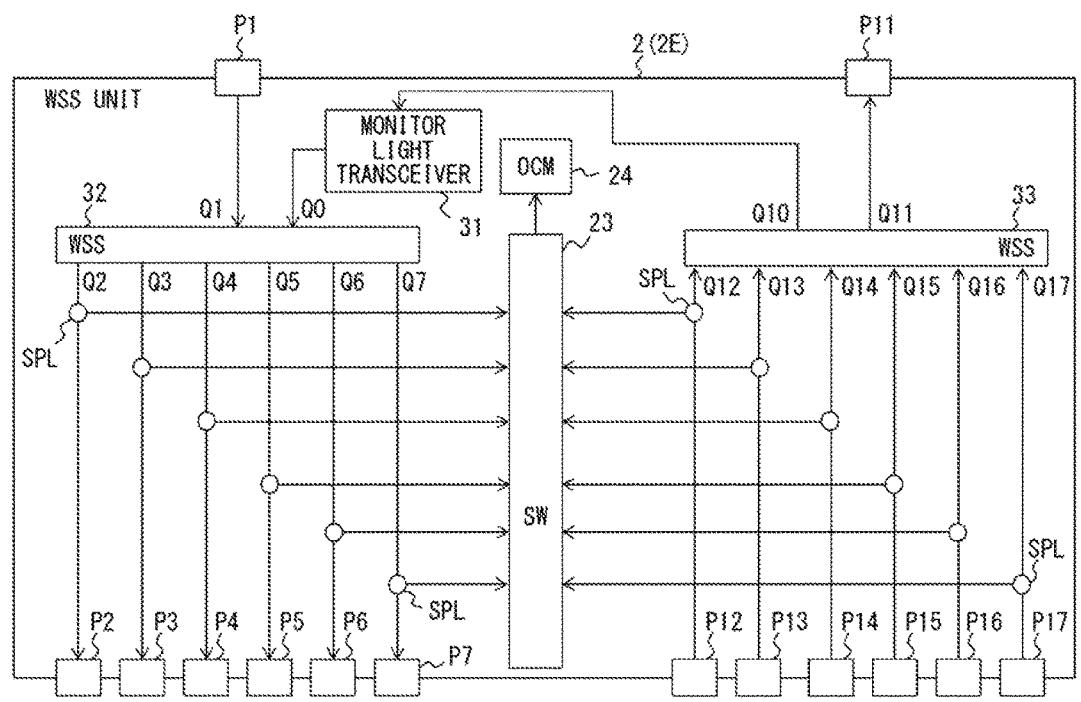
F I G. 6

F I G. 9A

<PARAMETER : 0>

| OUTPUT PORT | ROUTE LOSS (dB) |
|---|---|
| P2 | 5.1 |
| P3 | 5.1 |
| P4 | 5.2 |
| P5 | 5.2 |
| P6 | 5.2 |
| P7 | 5.3 |

<PARAMETER : 1>

| OUTPUT PORT | ROUTE LOSS (dB) |
|---|---|
| P2 | 5.2 |
| P3 | 5.2 |
| P4 | 5.3 |
| P5 | 5.3 |
| P6 | 5.4 |
| P7 | 5.4 |

...

<PARAMETER : 10>

| OUTPUT PORT | ROUTE LOSS (dB) |
|---|---|
| P2 | 6.1 |
| P3 | 6.1 |
| P4 | 6.2 |
| P5 | 6.2 |
| P6 | 6.2 |
| P7 | 6.3 |

F I G. 9B

<PARAMETER : 0>

| INPUT PORT | ROUTE LOSS (dB) |
|---|---|
| P12 | 6.4 |
| P13 | 6.4 |
| P14 | 6.3 |
| P15 | 6.3 |
| P16 | 6.2 |
| P17 | 6.2 |

<PARAMETER : 1>

| INPUT PORT | ROUTE LOSS (dB) |
|---|---|
| P12 | 6.5 |
| P13 | 6.5 |
| P14 | 6.5 |
| P15 | 6.4 |
| P16 | 6.4 |
| P17 | 6.3 |

...

<PARAMETER : 10>

| INPUT PORT | ROUTE LOSS (dB) |
|---|---|
| P12 | 7.4 |
| P13 | 7.3 |
| P14 | 7.3 |
| P15 | 7.3 |
| P16 | 7.2 |
| P17 | 7.2 |

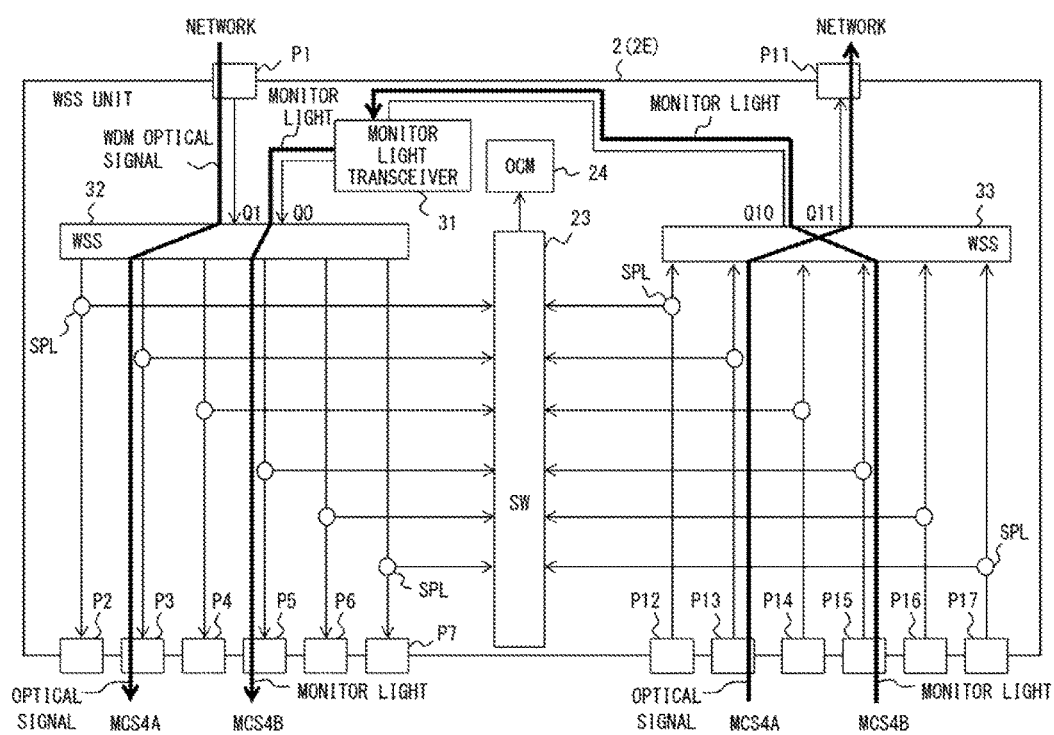
F I G. 10

OPTICAL TRANSMISSION DEVICE AND METHOD FOR CHECKING OPTICAL CONNECTION IN OPTICAL TRANSMISSION DEVICE

CROSS-REFERENCE TO RELATED APPLICATION

This application is based upon and claims the benefit of priority of the prior Japanese Patent Application No. 2016-037568, filed on Feb. 29, 2016, the entire contents of which are incorporated herein by reference.

FIELD

The embodiments discussed herein are related to an optical transmission device that transmits a wavelength division multiplexed optical signal and a method for checking an optical connection in the optical transmission device.

BACKGROUND

Wavelength Division Multiplexing (WDM) has been developed as one technique for achieving large-capacity optical communication networks. WDM can multiplex a plurality of optical signals of different wavelengths. That is, in a WDM optical communication network, a WDM optical signal in which a plurality of optical signals of different wavelengths are multiplexed is transmitted.

A Reconfigurable Optical Add/Drop Multiplexer (ROADM) may be implemented in each node in a WDM optical communication network as a transmission device that processes WDM optical signals. The ROADM may drop an optical signal of a desired wavelength from a received WDM optical signal and guide this optical signal to a client. The ROADM may add an optical signal received from a client to a WDM optical signal.

In addition, a ROADM that includes a CDC (Colorless, Directionless, Contentionless) function (this may hereinafter be referred to as a "CDC-ROADM") has been put into practical use as one technique for achieving a flexible network. The Colorless function can allocate a desired wavelength to a desired client port of a ROADM. The Directionless function can connect a client accommodated in the ROADM to a desired degree. The Contentionless function prevents collisions between optical signals of the same wavelength.

The CDC-ROADM includes a wavelength selective switch (WSS) and a multicast switch. The wavelength selective switch is provided for each degree, and guides one or a plurality of specified optical signals in a received WDM optical signal to the multicast switch. Further, the wavelength selective switch adds one or a plurality of optical signals received from the multicast switch to a WDM optical signal. The multicast switch accommodates one or a plurality of transponders and guides an optical signal received from the wavelength selective switch to a specified transponder. Further, the multicast switch guides an optical signal received from a transponder to a specified degree (that is, to a specified wavelength selective switch). A client terminal may be connected to each transponder.

In a node having many degrees, a CDC-ROADM includes many wavelength selective switches and each of the wavelength selective switches also includes many optical ports. When the CDC-ROADM accommodates many transponders, there are many multicast switches, and each of the multicast switches also includes many optical ports. In these cases, a connection between optical fibers in the CDC-ROADM is complicated.

For example, a connection of optical fibers in the CDC-ROADM is made manually by a user or a network administrator. This may result in connecting an optical fiber to an incorrect optical port. Thus, there has been a need for a method for checking that an optical fiber is connected correctly or properly in a CDC-ROADM.

A method for testing an optical transmission path in a device is disclosed in, for example, Japanese Laid-open Patent Publication No. 2011-155612. A method for measuring the intensity of an optical signal in a WDM communication system is disclosed in, for example, Japanese Laid-open Patent Publication No. 2008-139073. A configuration that realizes a stable output level of each signal light in an optical amplifier that amplifies wavelength division multiplexed light is disclosed in, for example, Japanese Laid-open Patent Publication No. 2006-166478.

For example, a connection of optical fibers in a CDC-ROADM is checked by transmitting monitor light from a wavelength selective switch to a multicast switch and by monitoring the monitor light looped back from the multicast switch in the wavelength selective switch. Here, the wavelength selective switch includes an optical channel monitor (OCM) that measures a power of each wavelength channel multiplexed in a WDM optical signal. Thus, if a wavelength of monitor light is allocated in a WDM optical signal band, it is possible to check a connection of optical fibers in a CDC-ROADM using an existing optical channel monitor, without implementing a dedicated circuit used for monitoring monitor light.

However, in this configuration, it is not possible to check a connection of optical fibers in a CDC-ROADM using monitor light when all of the wavelength channels in a WDM transmission system are in use. In other words, there is a possibility that a connection at an unused optical port in a CDC-ROADM will not be checked while providing a communication service.

As described above, there is a possibility that it will not be possible to operate or maintain a CDC-ROADM efficiently. This problem may occur not only in a CDC-ROADM but also in an optical transmission device that transmits a WDM optical signal.

SUMMARY

According to an aspect of the present invention, an optical transmission device that transmits an optical signal in a specified wavelength band includes: a receiver configured to receive the optical signal; a monitor light unit configured to output monitor light of a wavelength allocated outside of the specified wavelength band; a wavelength selective switch configured to output the optical signal via a first port and to output the monitor light via a second port; and a memory configured to store information that indicates an optical power loss of a route through which the monitor light is transmitted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of checking an optical connection by the wavelength selective switch unit of FIG. 3;

FIG. 6 illustrates an example of a wavelength selective switch unit according to embodiments of the present invention;

FIGS. 9A and 9B illustrate example of power loss information;

FIG. 10 illustrates an example of checking a connection between units in a CDC-ROADM;

DESCRIPTION OF EMBODIMENTS

Figure 1:
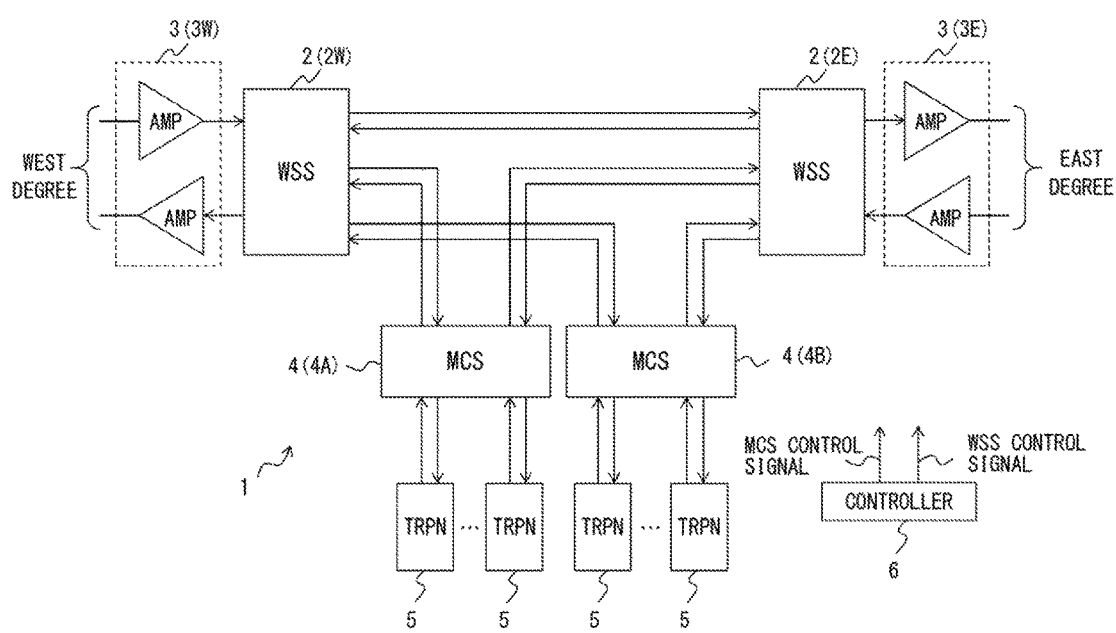
FIG. 1 illustrates an example of a configuration of an optical transmission device.

FIG. 1 illustrates an example of a configuration of an optical transmission device according to embodiments of the present invention. In this example, the optical transmission device is a CDC-ROADM provided in each node in a WDM transmission network.

A CDC-ROADM 1 has a plurality of degrees. In the example of FIG. 1, the CDC-ROADM 1 has a west degree and an east degree. Each degree is implemented by an optical transmission link between the CDC-ROADM 1 and an adjacent node. The optical transmission link between the CDC-ROADM 1 and the adjacent node includes a set of optical fiber cables that transmit an optical signal bidirectionally. In other words, the CDC-ROADM 1 receives a WDM optical signal from an adjacent node via each degree, and transmits a WDM optical signal to an adjacent node via each degree. The CDC-ROADM 1 may have three or more degrees.

The CDC-ROADM 1 includes a wavelength selective switch unit (WSS) 2 and an amplifier circuit 3 for each degree. In the example of FIG. 1, a wavelength selective switch unit 2W and an amplifier circuit 3W are provided for the west degree, and a wavelength selective switch unit 2E and an amplifier circuit 3E are provided for the east degree.

The CDC-ROADM 1 includes a multicast switch unit (MCS) 4 and a transponder 5 in order to accommodate a client terminal. In the example of FIG. 1, the CDC-ROADM 1 includes multicast switch units 4A and 4B. Each of the multicast switch units 4A and 4B accommodates a plurality of transponders 5. A client terminal may be connected to each of the transponders 5. The CDC-ROADM 1 may include three or more multicast switch units 4.

Each of the multicast switch units 4A and 4B is connected to the wavelength selective switch units 2W and 2E. Specifically, the multicast switch unit 4A and the wavelength selective switch unit 2W are connected by a set of optical fibers, the multicast switch unit 4A and the wavelength selective switch unit 2E are connected by a set of optical fibers, the multicast switch unit 4B and the wavelength selective switch unit 2W are connected by a set of optical fibers, and the multicast switch unit 4B and the wavelength selective switch unit 2E are connected by a set of optical fibers. Further, the wavelength selective switch unit 2W and the wavelength selective switch unit 2E are also connected by a set of optical fibers.

A controller 6 controls the wavelength selective switch units 2 (2W and 2E) and the multicast switch units 4 (4A and 4B) according to an instruction given by a user or a network administrator. For example, using a WSS control signal, the controller 6 can specify a wavelength dropped and/or added by the wavelength selective switch unit 2. Further, the controller 6 can establish a path in the multicast switch unit 4 using an MCS control signal. In other words, the controller 6 can provide a CDC function by controlling the wavelength selective switch unit 2 and the multicast switch unit 4 appropriately.

The controller 6 includes, for example, a processor and a memory. In this case, operations of the CDC-ROADM 1 are controlled by the processor executing a given program. The controller 6 may include a hardware circuit.

The CDC-ROADM 1 has a function that checks an optical connection between units implemented in the CDC-ROADM 1. In the following descriptions, the "unit" corresponds to the wavelength selective switch units 2W and 2E and the multicast switch units 4A and 4B.

Figure 2:
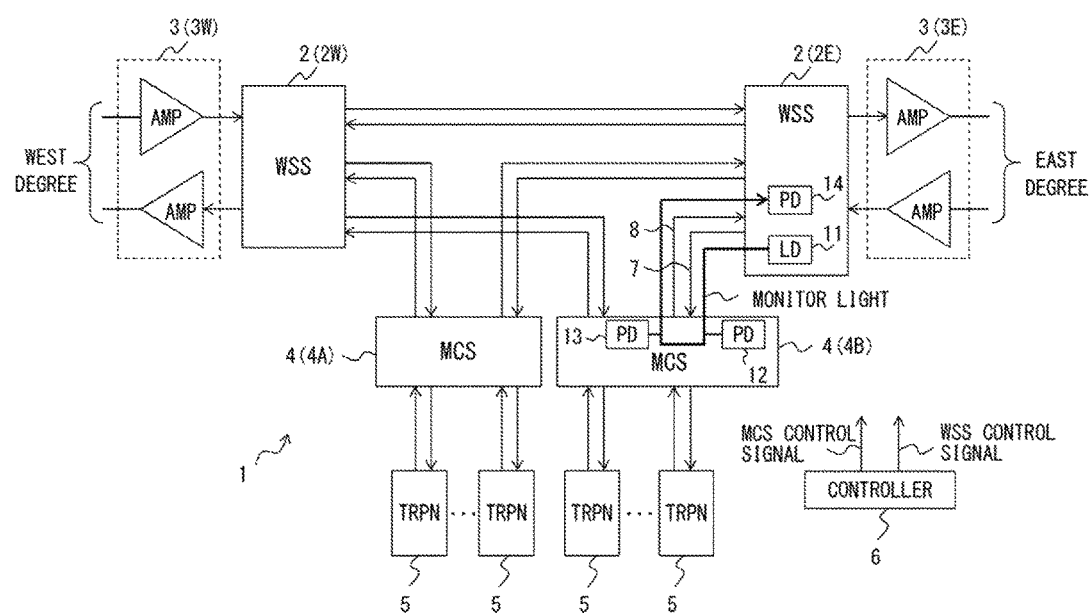
FIG. 2 illustrates an example of checking an optical connection.

FIG. 2 illustrates an example of checking an optical connection. In the example of FIG. 2, an optical connection between the wavelength selective switch unit 2E and the multicast switch unit 4B is checked. Note that optical fibers 7 and 8 are provided between the wavelength selective switch unit 2E and the multicast switch unit 4B. In this case, the wavelength selective switch unit 2E generates monitor light using a light source (LD) 11, and transmits the monitor light to the multicast switch unit 4B through the optical fiber 7. The multicast switch unit 4B loops back the monitor light received from the wavelength selective switch unit 2E. In other words, the multicast switch unit 4B transmits the monitor light to the wavelength selective switch unit 2E through the optical fiber 8.

At this point, the controller 6 checks an optical connection between the wavelength selective switch unit 2E and the multicast switch unit 4B according to a power of the monitor light. A photo detector (PD) 12 detects a power of light received through the optical fiber 7. A photo detector (PD) 13 detects a power of light transmitted through the optical fiber 8. A photo detector (PD) 14 detects a power of light received through the optical fiber 8. Then, the controller 6 checks a connection made by the optical fiber 7 according to a difference between an output power of the monitor light that is measured in the wavelength selective switch unit 2E and a reception power of the monitor light that is measured in the multicast switch unit 4B. Specifically, when the difference is smaller than a specified threshold, it is determined that the wavelength selective switch unit 2E and the multicast switch unit 4B are appropriately connected by the optical fiber 7. Likewise, the controller 6 checks a connection made by the optical fiber 8 according to a difference between an output power of the monitor light that is measured in the multicast switch unit 4B and a reception power of the monitor light that is measured in the wavelength selective switch unit 2E. Specifically, when the difference is smaller than the specified threshold, it is determined that the wavelength selective switch unit 2E and the multicast switch unit 4B are appropriately connected by the optical fiber 8.

Figure 3:
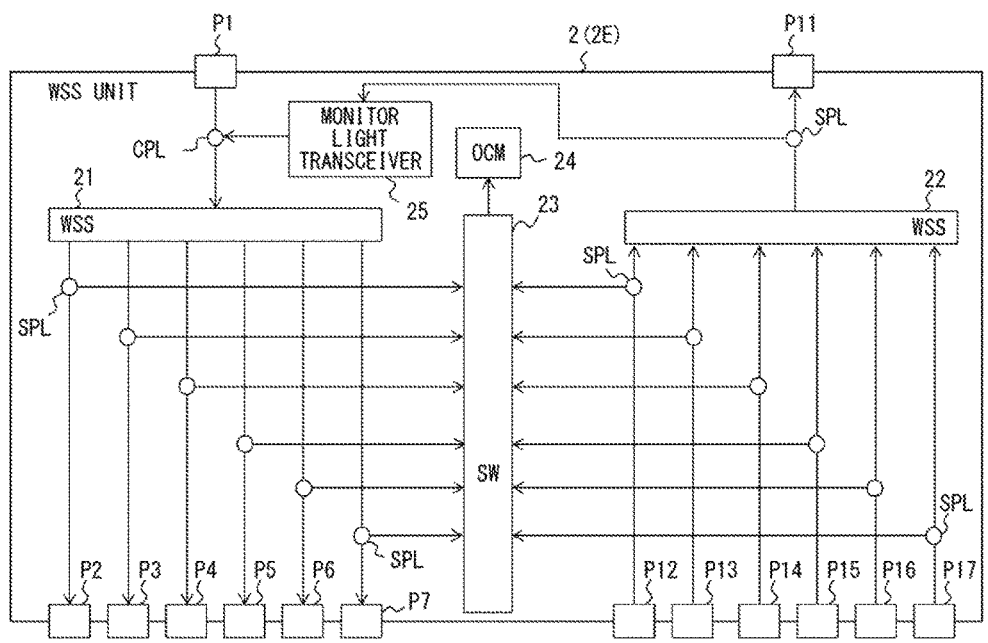
FIG. 3 illustrates an example of a wavelength selective switch unit.

FIG. 3 illustrates an example of the wavelength selective switch unit 2. The wavelength selective switch unit 2 includes a plurality of optical ports P1 and P11 on the network side and a plurality of optical ports P2-P7 and P12-P17 on the client side. However, the number of optical ports on the client side that are included in the wavelength selective switch unit 2 is not limited to the example illustrated in FIG. 3.

The wavelength selective switch unit 2 receives an optical signal from a corresponding degree via the optical port P1, and outputs an optical signal to a corresponding degree via the optical port P11. The optical ports P2-P7 and P12-P17 are respectively connected to the multicast switch unit 4 or to another wavelength selective switch unit 2. The wavelength selective switch unit 2 outputs an optical signal to the multicast switch unit 4 or to another wavelength selective switch unit 2 via one of the optical ports P2-P7, and receives an optical signal from the multicast switch unit 4 or from another wavelength selective switch unit 2 via one of the optical ports P12-P17.

The wavelength selective switch unit 2 includes wavelength selective switches 21 and 22, an optical switch 23, an optical channel monitor (OCM) 24, and a monitor light transceiver 25. The wavelength selective switch 21 separates a WDM optical signal received via the optical port P1 with respect to the wavelength, and guides an optical signal of a specified wavelength to a specified one or a plurality of the optical ports P2-P7.

For example, it is assumed that the multicast switch unit 4A is connected to the optical port P3, as illustrated in FIG. 4. It is also assumed that an instruction to guide optical signals of wavelength channels $\lambda 1$-$\lambda 3$ (hereinafter referred to as optical signals $\lambda 1$-$\lambda 3$) to the multicast switch unit 4A is given to the wavelength selective switch unit 2. In this case, the wavelength selective switch 21 selects the optical signals $\lambda 1$-$\lambda 3$ from a received WDM optical signal and guides them to the optical port P3. By doing this, the multicast switch unit 4A receives the optical signals $\lambda 1$-$\lambda 3$.

The wavelength selective switch 22 combines optical signals received via the optical ports P12-P17 so as to guide them to the optical port P11. However, the wavelength selective switch 22 can block an optical signal of a specified wavelength.

Each of the optical signals output from the wavelength selective switch 21 is split by a corresponding optical splitter (SPL) and guided to the optical switch 23. Each of the optical signals received via the optical ports P12-P17 is also split by a corresponding optical splitter (SPL) and guided to the optical switch 23. The optical switch 23 sequentially selects the input optical signals and guides them to the optical channel monitor 24. The optical channel monitor 24 monitors a power of an optical signal guided from the optical switch 23. In other words, the optical channel monitor 24 can monitor a power of each optical signal output to the multicast switch unit 4 and a power of each optical signal received from the multicast switch unit 4.

Figure 5A:
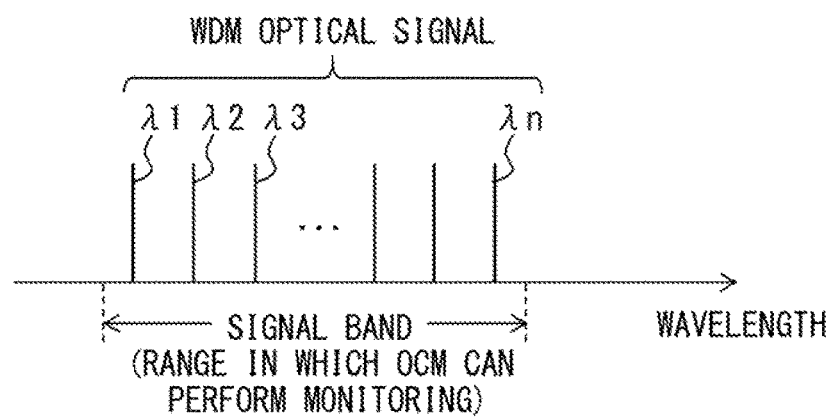
FIGS. 5A and 5B illustrate examples of wavelength allocations of a WDM optical signal and monitor light.

The optical channel monitor 24 can measure a power of each wavelength channel multiplexed in a WDM optical signal. For example, as illustrated in FIG. 5A, when wavelength channels $\lambda 1$-$\lambda n$ are multiplexed in a WDM optical signal, the optical channel monitor 24 can measure powers of the wavelength channels $\lambda 1$-$\lambda n$ individually. However, it is assumed that, in this example, the optical channel monitor 24 can measure an optical power in a signal band allocated to the WDM optical signal.

The monitor light transceiver 25 generates monitor light used to check an optical connection between units in the CDC-ROADM 1. The monitor light output from the monitor light transceiver 25 is combined with a received WDM optical signal by an optical coupler (CPL) and input to the wavelength selective switch 21. The wavelength selective switch 21 guides the monitor light to an optical port that corresponds to a unit whose optical connection is to be checked.

For example, it is assumed that the multicast switch unit 4B is connected to the optical port P5, as illustrated in FIG. 4. It is also assumed that an instruction to check an optical connection between the wavelength selective switch unit 2 and the multicast switch unit 4B is given to the wavelength selective switch unit 2. In this case, the wavelength selective switch 21 guides the monitor light output from the monitor light transceiver 25 to the optical port P5. This monitor light is propagated to the multicast switch unit 4B through the optical fiber 7 illustrated in FIG. 2. The multicast switch unit 4B loops back this monitor light. In other words, the monitor light transmitted from the multicast switch unit 4B to the wavelength selective switch unit 2 is propagated through the optical fiber 8 illustrated in FIG. 2 and arrives at the optical port P15.

In the wavelength selective switch unit 2, the monitor light guided from the wavelength selective switch 21 to the optical port P5 is split by an optical splitter and guided to the optical channel monitor 24 by the optical switch 23. In other words, a power of the monitor light output to the multicast switch unit 4B may be measured by the optical channel monitor 24. The monitor light received via the optical port P15 is split by an optical splitter and guided to the optical channel monitor 24 by the optical switch 23. In other words, a power of the monitor light received from the multicast switch unit 4B may be measured by the optical channel monitor 24. Alternatively, the monitor light received via the optical port P15 may be guided to the monitor light transceiver 25 by the wavelength selective switch 22. In this case, the power of the monitor light received from the multicast switch unit 4B is measured by the monitor light transceiver 25. Then, the controller 6 checks an optical connection between the wavelength selective switch unit 2 (2E) and the multicast switch unit 4 (4B) using results of these measurements.

As described above, the optical channel monitor 24 can measure an optical power in a signal band allocated to a WDM optical signal. Thus, in a configuration in which a power of monitor light is measured using the optical channel monitor 24, monitor light needs to be allocated in a signal band allocated to a WDM optical signal. For example, monitor light is allocated to an unused wavelength channel from among the wavelength channels $\lambda 1$-$\lambda n$ of a WDM optical signal. Then, while operating, the CDC-ROADM 1 can check an optical connection between units in the CDC-ROADM 1 using the unused wavelength channel. In the example of FIG. 4, the CDC-ROADM 1 can check an optical connection between the wavelength selective switch unit 2E and the multicast switch unit 4B while providing a communication service to a client accommodated in the multicast switch unit 4A.

However, in this configuration, when all of the wavelength channels $\lambda 1$-$\lambda n$ of a WDM optical signal are in use, the CDC-ROADM 1 is not able to check an optical connection between units using monitor light. For example, it is assumed that a received WDM optical signal includes optical signals $\lambda 1$-$\lambda n$ and that the wavelength of monitor light is $\lambda n$. In this case, the wavelength selective switch 21 is not able to guide the optical signal $\lambda n$ and the monitor light to different optical ports. In the example of FIG. 4, when the wavelength selective switch 21 guides the optical signal λn to the optical port P3, the monitor light is also guided to the optical port P3.

In the configuration of FIG. 3, the following problems may occur.

(1) Monitor light received from the multicast switch unit 4 is output to the network via the optical port P11 together with an optical signal transmitted from a client. In this case, the quality of an optical signal multiplexed in a WDM optical signal may be deteriorated.

(2) When the wavelength of a monitor light is used by an optical signal, the wavelength selective switch 22 blocks the monitor light in order to output the optical signal to the network. Thus, it is not possible to measure a power of the monitor light using the monitor light transceiver 25.

In order to solve these problems, a CDC-ROADM according to the embodiments of the present invention checks an optical connection between units using monitor light of a wavelength allocated outside of a signal band allocated to a WDM optical signal.

Embodiment

FIG. 6 illustrates an example of the wavelength selective switch unit 2 implemented in a CDC-ROADM according to the embodiments of the present invention. In the example of FIG. 6, the wavelength selective switch unit 2 includes a monitor light transceiver 31, wavelength selective switches 32 and 33, the optical switch 23, and the optical channel monitor 24. The optical switch 23 and the optical channel monitor 24 are substantially the same in FIGS. 3 and 6, so their descriptions are omitted. Further, as in the configuration illustrated in FIG. 3, the wavelength selective switch unit 2 includes the optical ports P1 and P11 on the network side and the optical ports P2-P7 and P12-P17 on the client side.

Figure 5B:
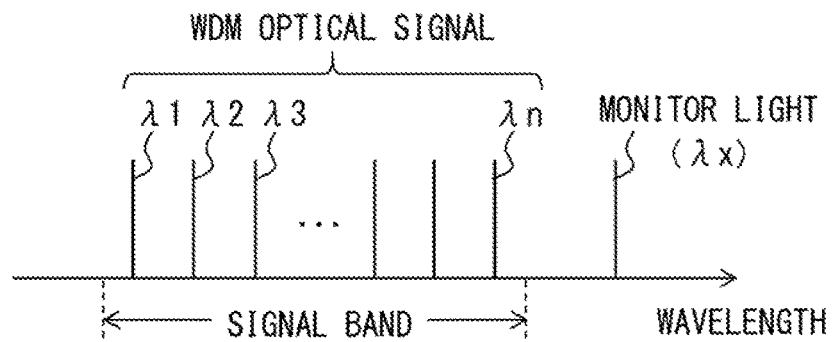

The monitor light transceiver 31 generates and outputs monitor light, as does the monitor light transceiver 25 illustrated in FIG. 3. However, as illustrated in FIG. 5B, the monitor light transceiver 31 generates monitor light of a wavelength λx allocated outside of a signal band allocated to a WDM optical signal. The monitor light of a wavelength λx may hereinafter be referred to as a "monitor light λx". The monitor light transceiver 31 is realized by, for example, an SFP/XFP-type module.

Figure 7:
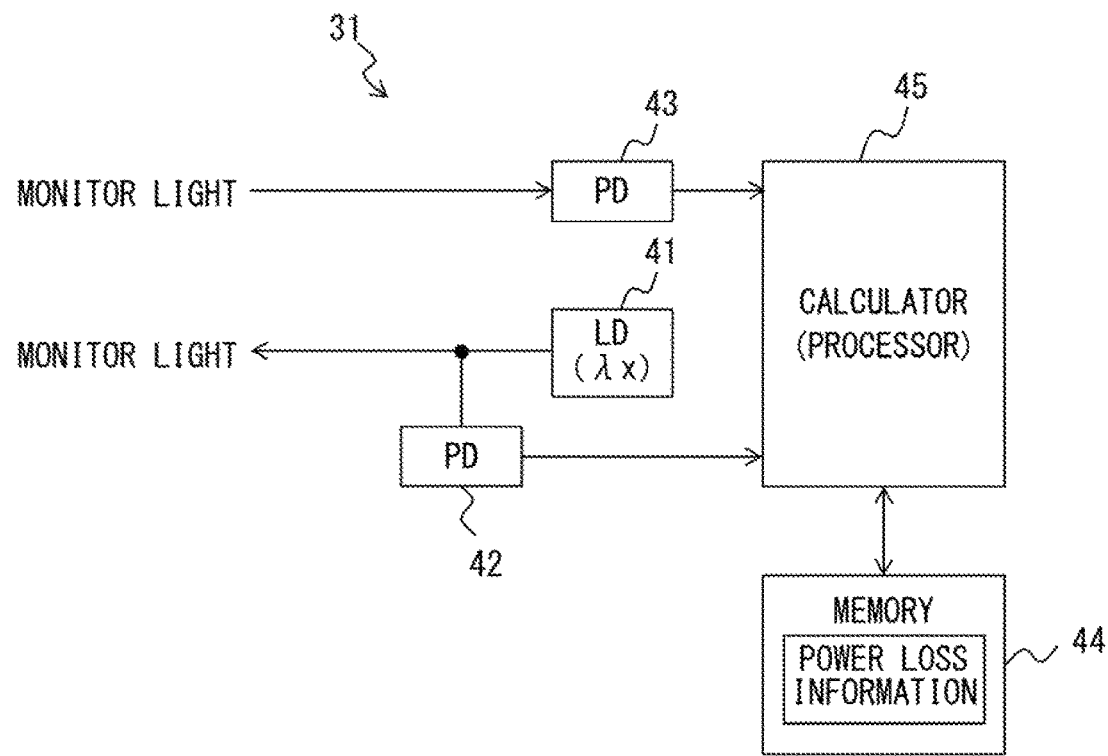
FIG. 7 illustrates an example of a configuration of a monitor light transceiver.

FIG. 7 illustrates an example of a configuration of the monitor light transceiver 31. In the example of FIG. 7, the monitor light transceiver 31 includes a light source (LD) 41, a photo detector (PD) 42, a photo detector (PD) 43, a memory 44, and a calculator 45. The light source 41 generates monitor light of a wavelength λx allocated outside of a signal band. The wavelength λx of the monitor light may be longer or shorter than a signal band λ1-λn. The photo detector 42 detects a power of the monitor light output from the light source 41. The photo detector 43 detects a power of monitor light received from another unit (in the example FIG. 2, the multicast switch unit 4B). The memory 44 stores power loss information that will be described later. The calculator 45 calculates an output power of monitor light at each of the output ports (P2-P7) of the wavelength selective switch unit 2 according to the power of the monitor light detected by the photo detector 42 and the power loss information stored in the memory 44. The calculator 45 calculates a reception power of monitor light at each of the input ports (P12-P17) of the wavelength selective switch unit 2 according to the power of the monitor light detected by the photo detector 43 and the power loss information stored in the memory 44. The calculator 45 is realized by a processor that executes a given program. However, some of the functions of the calculator 45 may be realized by a hardware circuit.

In the example of FIGS. 6 and 7, the calculator 45 is implemented in the wavelength selective switch unit 2, but the embodiments of the present invention are not limited to this configuration. In other words, the processor that calculates a power of monitor light may be provided outside the wavelength selective switch unit 2. Further, in the example of FIGS. 6 and 7, the power loss information is stored in the wavelength selective switch unit 2, but the embodiments of the present invention are not limited to this configuration. In other words, the memory that stores the power loss information may be provided outside the wavelength selective switch unit 2.

The wavelength selective switch 32 includes two input ports (Q1 and Q0) and a plurality of output ports (Q2-Q7). The input port Q1 is optically connected to the optical port P1 of the wavelength selective switch unit 2, and the output ports Q2-Q7 are optically connected to the optical ports P2-P7 of the wavelength selective switch unit 2, respectively. A WDM optical signal received via the optical port P1 is guided to the input port Q1. Then, the wavelength selective switch 32 guides an optical signal of a specified wavelength in this WDM optical signal to a specified output port (Q2-Q7). Further, monitor light generated by the monitor light transceiver 31 is input to the input port Q0. The wavelength selective switch 32 can guide this monitor light to a specified output port (Q2-Q7).

Figure 8:
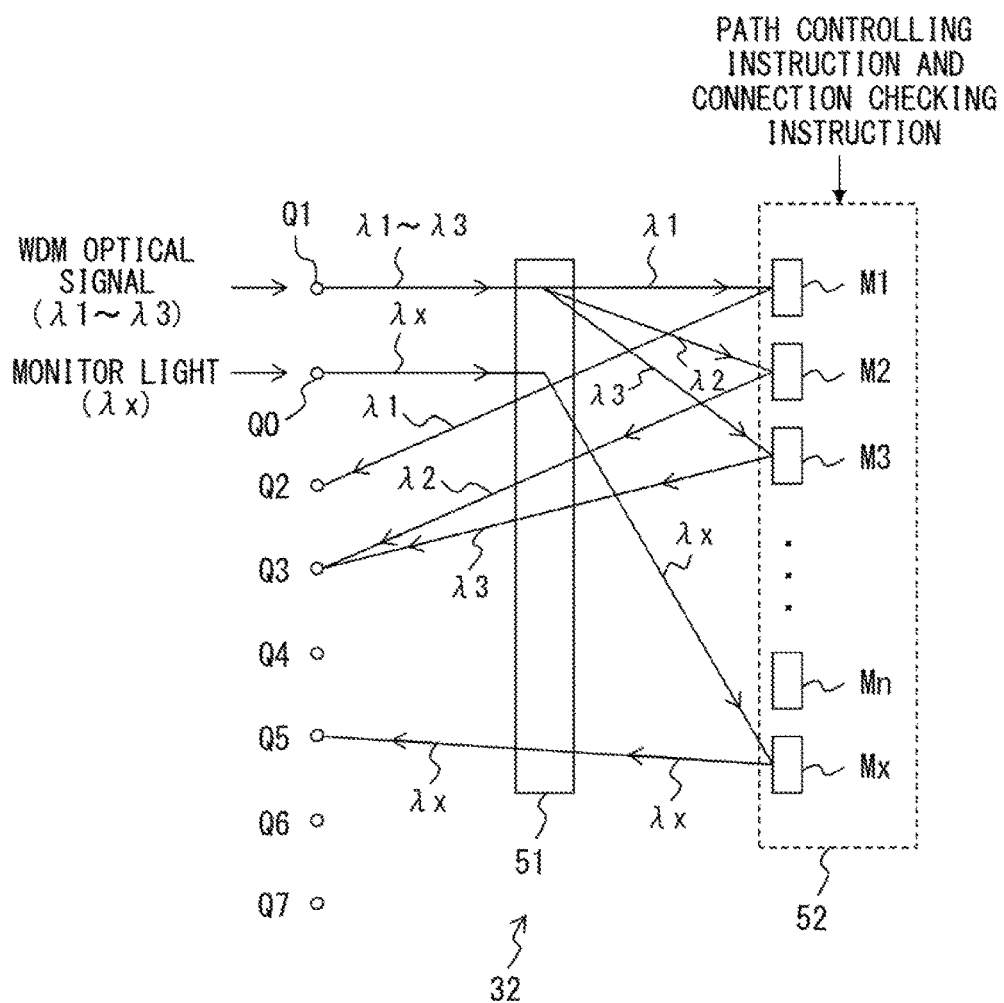
FIG. 8 illustrates an example of a wavelength selective switch.

FIG. 8 illustrates an example of the wavelength selective switch 32. In the example of FIG. 8, the wavelength selective switch 32 includes an optical block 51 and a mirror circuit 52. The optical block 51 includes, for example, a grating and a lens, and it separates input light with respect to wavelength and guides each input light to a corresponding mirror. The mirror circuit 52 includes mirrors M1-Mn and Mx that are provided for each wavelength. The mirrors M1-Mn and Mx are provided for the wavelengths λ1-λn and λx, respectively. An angle of each of the mirrors M1-Mn is controlled according to a path controlling instruction. An angle of the mirror Mx is controlled according to a connection checking instruction. The path controlling instruction and the connection checking instruction are, for example, given by the controller 6 illustrated in FIG. 1.

In the example of FIG. 8, a WDM optical signal that includes optical signals λ1-λ3 is input to the wavelength selective switch 32 via the input port Q1. This WDM optical signal is guided to the optical block 51. The optical block 51 separates the WDM optical signal with respect to wavelength and guides the optical signals λ1-λ3 to the mirrors M1-M3, respectively. Here, it is assumed that the following path controlling instructions have been given to the wavelength selective switch 32.

Optical signal λ1: output via the optical port P2 of the wavelength selective switch unit 2
Optical signal λ2: output via the optical port P3 of the wavelength selective switch unit 2
Optical signal λ3: output via the optical port P3 of the wavelength selective switch unit 2

In this case, according to the path controlling instruction, the mirror circuit 52 controls the mirror M1 such that the optical signal λ1 is guided to the output port Q2, and controls the mirrors M2 and M3 such that the optical signals λ2 and λ3 are guided to the output port Q3. As a result, the optical signal λ1 is output via the output port Q2 and the optical port P2. The optical signals λ2 and λ3 are output via the output port Q3 and the optical port P3.

Monitor light λx input to the wavelength selective switch 32 via the input port Q0 is guided to the mirror Mx by the optical block 51. Here, it is assumed that the connection checking instruction "check an optical connection at the optical port P5 of the wavelength selective switch unit 2" is given to the wavelength selective switch 32. In this case, according to the connection checking instruction, the mirror circuit 52 controls the mirror Mx such that the monitor light is guided to the output port Q5. As a result, the monitor light λx is output via the output port Q5 and the optical port P5.

The wavelength selective switch 32 may have an attenuation function that adjusts a power of output light of each wavelength channel. For example, the attenuation function controls an attenuation amount for input light such that a power of output light matches a target level. The attenuation amount is controlled by, for example, adjusting an angle of a corresponding mirror of the mirror circuit 52. In this example, in order to simplify the descriptions, it is assumed that a preferable attenuation amount controlled by the attenuation function of the wavelength selective switch 32 is determined in advance or in its initial operation. In this case, a parameter to realize a preferable attenuation amount may be set in a controller (not illustrated) that controls a state of the wavelength selective switch 32 and may be stored in the memory 44. For example, this parameter indicates an angle of a corresponding mirror.

The wavelength selective switch 33 includes two output ports (Q11 and Q10) and a plurality of input ports (Q12-Q17). The output port Q11 is optically connected to the optical port P11 of the wavelength selective switch unit 2, and the input ports Q12-Q17 are optically connected to the optical ports P12-P17 of the wavelength selective switch unit 2, respectively. The wavelength selective switch 33 guides optical signals input via the input ports Q12-Q17 to the output port Q11. Then, these optical signals are combined in the wavelength selective switch 33 to be output. However, the wavelength selective switch 33 guides input light to the output port Q10 when the wavelength of the input light is λx. In other words, when monitor light λx is input via one of the input ports Q12-Q17, the wavelength selective switch 33 outputs the monitor light λx via the output port Q10. The monitor light λx output via the output port Q10 is guided to the monitor light transceiver 31.

As in the configuration illustrated in FIG. 8, the wavelength selective switch 33 includes, for example, an optical block and a mirror circuit. In other words, the configuration and the operation of the wavelength selective switch 33 are similar to those of the wavelength selective switch 32. Thus, the descriptions of the configuration and the operation of the wavelength selective switch 33 are omitted.

FIGS. 9A and 9B illustrate examples of power loss information. The power loss information includes output power loss information used to calculate an output power and reception power loss information used to calculate a reception power. The output power loss information and the reception power loss information are stored in the memory 44.

As illustrated in FIG. 9A, the output power loss information represents a route loss for each of the optical ports P2-P7 of the wavelength selective switch unit 2. The route loss in the output power loss information represents an optical power loss of a route from the monitor light transceiver 31 to a corresponding optical port. For example, a route loss that corresponds to the optical port P2 represents an optical power loss when light is transmitted from the monitor light transceiver 31 to the optical port P2. The output power loss information may be obtained by inputting reference light of a wavelength λx to the input port Q0 of the wavelength selective switch 32 and measuring a power of the reference light at each of the optical ports P2-P7, for example. In this case, it is assumed that the power of the reference light input to the wavelength selective switch 32 is known.

With respect to each of the optical ports P2-P7, a route loss is measured for a parameter to adjust an attenuation amount when the wavelength selective switch 32 has an attenuation function. For example, this parameter represents a setting value to control an angle of a mirror of the wavelength selective switch 32. In the example of FIG. 9A, "parameter: 0" represents a state in which an attenuation amount is controlled at minimum by an attenuation function. Note that "parameter: 1" through "parameter: 10" are obtained for different attenuation amount.

As illustrated in FIG. 9B, the reception power loss information represents a route loss for each of the optical ports P12-P17 of the wavelength selective switch unit 2. The route loss in the reception power loss information represents an optical power loss of a route from a corresponding optical port to the monitor light transceiver 31. For example, a route loss that corresponds to the optical port P12 represents an optical power loss when light is transmitted from the optical port P12 to the monitor light transceiver 31. The route loss included in the reception power loss information may be obtained by inputting reference light of a wavelength λx via a corresponding optical port and measuring a power of the reference light using the receiver 43 of the monitor light transceiver 31, for example. In this case, it is assumed that the power of the reference light input via the corresponding optical port is known.

With respect to each of the optical ports P12-P17, a route loss is measured for a parameter to adjust an attenuation amount when the wavelength selective switch 33 has an attenuation function. For example, this parameter represents a setting value to control an angle of a mirror of the wavelength selective switch 33. In the example of FIG. 9B, "parameter: 0" represents a state in which an attenuation amount is controlled at minimum by an attenuation function. Note that "parameter: 1" through "parameter: 10" are obtained for different attenuation amount.

As described above, in this example, power loss information is generated by measuring an optical power loss of each route in the wavelength selective switch unit 2. The generated power loss information is stored in the memory 44.

FIG. 10 illustrates an example of checking a connection between units in a CDC-ROADM. The wavelength selective switch unit 2 of FIG. 10 corresponds to the wavelength selective switch unit 2E implemented in the CDC-ROADM 1 which is illustrated in FIGS. 1 and 2. The CDC-ROADM 1 provides a communication service to a client accommodated in the multicast switch unit 4A. In other words, the CDC-ROADM 1 is in operation. Then, an optical connection between the wavelength selective switch unit 2E and the multicast switch unit 4B is checked. The multicast switch unit 4A is connected to the optical ports P3 and P13 of the wavelength selective switch unit 2E. It is assumed that the multicast switch unit 4B is newly connected to the optical ports P5 and P15 of the wavelength selective switch unit 2E.

When the optical connection between the wavelength selective switch unit 2E and the multicast switch unit 4B is checked, the controller 6 gives, to the wavelength selective switch unit 2E, a connection checking instruction that specifies the multicast switch unit 4B as a target unit. Then, the monitor light transceiver 31 generates monitor light. As described above, the wavelength of the monitor light is allocated outside of a signal band allocated to a WDM optical signal. The wavelength selective switch 32 establishes an optical path such that light input to the input port Q0 is guided to the optical port P5. The wavelength selective switch 33 establishes an optical path such that light received from the optical port P15 is guided to the monitor light transceiver 31 via the output port Q10.

As a result of the establishment of the optical paths described above, the monitor light is output via the optical port P5. At this point, when the wavelength selective switch unit 2E and the multicast switch unit 4B are connected appropriately, the monitor light output via the optical port P5 is transmitted to the multicast switch unit 4B. As illustrated in FIG. 2, the multicast switch unit 4B loops back this monitor light. In other words, the multicast switch unit 4B transmits the monitor light to the wavelength selective switch unit 2E. Then, the monitor light received via the optical port P15 in the wavelength selective switch unit 2E is guided to the monitor light transceiver 31 by the wavelength selective switch 33.

At this point, according to an output signal of the photo detector 42, the calculator 45 detects a power (P_out_LD) of the monitor light output from the light source 41. Further, according to an output signal of the photo detector 43, the calculator 45 detects a power (P_in_PD) of the monitor light received by the monitor light transceiver 31.

According to the power (P_out_LD) of the monitor light output from the light source 41 and the power loss information stored in the memory 44, the calculator 45 calculates an output power (P_out_port) of the monitor light at an edge (that is, an optical port) of the wavelength selective switch unit 2E. Here, it is assumed that the operational state of the wavelength selective switch 32 (here, an attenuation amount) is adjusted in advance. In this example, it is assumed that the operational state of the wavelength selective switch 32 is adjusted according to "parameter: 1". The monitor light is output via the optical port P5. Thus, in the example of FIG. 9A, the route loss is 5.3 dB. In this case, the output power (P_out_port) of the monitor light at the optical port P5 is calculated using the following formula.

$$P\_out\_port = P\_out\_LD - 5.3$$

Then, the calculator 45 reports a result of this calculation to the controller 6.

The controller 6 detects a reception power (P_12) of the monitor light in the multicast switch unit 4B using the photo detector 12 illustrated in FIG. 2. Then, the controller 6 checks an optical connection between the optical port P5 of the wavelength selective switch unit 2E and the multicast switch unit 4B according to a difference between the output power (P_out_port) of the monitor light that is calculated by the calculator 45 and the reception power (P_12) of the monitor light in the multicast switch unit 4B. Specifically, when the difference is smaller than a specified threshold, the controller 6 determines that the optical port P5 of the wavelength selective switch unit 2E and the multicast switch unit 4B are appropriately connected by the optical fiber 7.

According to the power (P_in_PD) of the monitor light received by the monitor light transceiver 31 and the power loss information stored in the memory 44, the calculator 45 calculates a reception power (P_in_port) of the monitor light at an edge (that is, an optical port) of the wavelength selective switch unit 2E. Here, it is assumed that the operational state of the wavelength selective switch 33 (here, an attenuation amount) is adjusted in advance. In this example, it is assumed that the operational state of the wavelength selective switch 33 is adjusted according to "parameter: 1". The monitor light arrives at the optical port P15. Thus, in the example of FIG. 9B, the route loss is 6.4 dB. In this case, the reception power (P_in_port) of the monitor light at the optical port P15 is calculated using the following formula.

$$P\_in\_port = P\_in\_PD + 6.4$$

Then, the calculator 45 reports a result of this calculation to the controller 6.

The controller 6 detects an output power (P_13) of the monitor light in the multicast switch unit 4B using the photo detector 13 illustrated in FIG. 2. Then, the controller 6 checks an optical connection between the optical port P15 of the wavelength selective switch unit 2E and the multicast switch unit 4B according to a difference between the reception power (P_in_port) of the monitor light that is calculated by the calculator 45 and the output power (P_13) of the monitor light in the multicast switch unit 4B. Specifically, when the difference is smaller than the specified threshold, the controller 6 determines that the optical port P15 of the wavelength selective switch unit 2E and the multicast switch unit 4B are appropriately connected by the optical fiber 8.

As described above, in the CDC-ROADM 1 according to the embodiments, a wavelength of monitor light is allocated outside of a signal band allocated to a WDM optical signal. Thus, even if all of the wavelength channels in the WDM optical signal are in use, it is possible to check a connection between units in the CDC-ROADM 1. In other words, the CDC-ROADM 1 can check an optical connection at an unused port while it is in service. For example, in the example of FIG. 10, data communication is being performed via the optical ports P3 and P13. In this case, the CDC-ROADM 1 can check an optical connection at each of the optical ports P2, P4-P7, P12, and P14-P17 without stopping the data communication that is being performed via the optical ports P3 and P13.

The wavelength of monitor light is allocated outside of a signal band, so there is a possibility that it will not be possible to detect a power of the monitor light using the optical channel monitor 24. Thus, an output power and a reception power of the monitor light are measured using the photo detectors 42 and 43, respectively. Further, power loss information that indicates a route loss in the CDC-ROADM 1 is created in advance. Then, powers of the monitor light at output/input ports of the wavelength selective switch unit 2 are calculated according to measurement values and the power loss information that indicates a route loss in the CDC-ROADM 1. As a result, the powers of the monitor light at the output/input ports can be calculated with a high degree of accuracy without directly measuring the powers of the monitor light at the output/input ports. If a wavelength range in which the optical channel monitor 24 can perform monitoring is extended, it may be possible to directly measure powers of monitor light at output/input ports. However, in this case, the optical channel monitor 24 will be more expensive.

Figure 11:
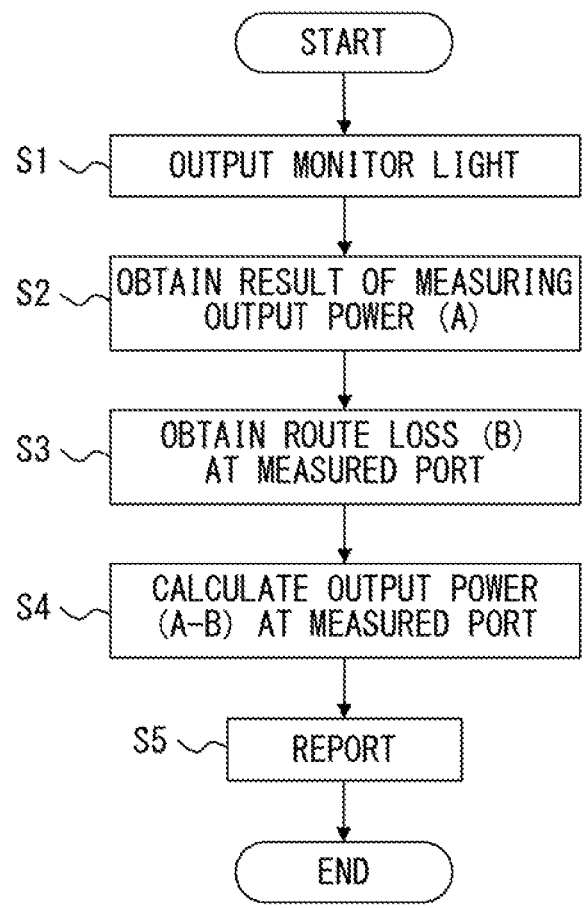
FIG. 11 is a flowchart that illustrates an example of a method for calculating an output power of monitor light.

FIG. 11 is a flowchart that illustrates an example of a method for calculating an output power of monitor light. Processing in this flowchart is performed, for example, when a connection checking instruction that specifies a target unit (in the example described above, the multicast switch unit 4) is given from the controller 6 to the wavelength selective switch unit 2.

In S1, the monitor light transceiver 31 outputs monitor light. Here, according to a connection checking instruction, the wavelength selective switch 32 establishes a path such that the monitor light is guided to a target unit. In the descriptions related to FIG. 11, an optical port that corresponds to the target unit may be referred to as a "measured port".

In S2, the photo detector 42 measures an output power of the monitor light output from the monitor light transceiver 31. Then, the calculator 45 obtains a result of the measurement. In S3, the calculator 45 obtains a route loss value that corresponds to a measured port from the memory 44. In the example of FIG. 10, the calculator 45 obtains a route loss value that corresponds to the optical port P5. Here, the route loss value that corresponds to the optical port P5 is extracted from a table that corresponds to a parameter specifying an operational state of the wavelength selective switch 32. In S4, the calculator 45 subtracts the route loss value obtained in S3 from an output power value obtained in S2, so as to calculate an output power of the monitor light at the measured port. Then, in S5, the calculator 45 reports a result of the calculation to the controller 6.

Figure 12:
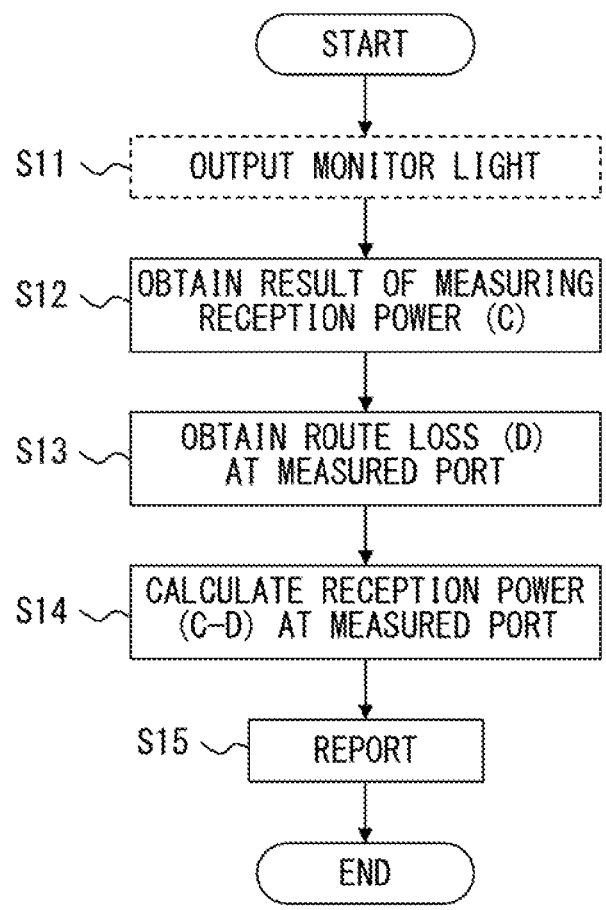
FIG. 12 is a flowchart that illustrates an example of a method for calculating a reception power of monitor light.

FIG. 12 is a flowchart that illustrates an example of a method for calculating a reception power of monitor light. Processing in this flowchart is also performed, for example, when a connection checking instruction that specifies a target unit is given from the controller 6 to the wavelength selective switch unit 2.

In S11, the monitor light transceiver 31 outputs monitor light. However, when the monitor light is generated in another unit, the monitor light transceiver 31 does not have to generate the monitor light. According to a connection checking instruction, the wavelength selective switch 33 establishes a path such that the monitor light received from a target unit is guided to the monitor light transceiver 31. In the descriptions related to FIG. 12, an optical port that corresponds to the target unit may be referred to as a "measured port".

In S12, the photo detector 43 measures a reception power of the monitor light guided from the wavelength selective switch 33. Then, the calculator 45 obtains a result of the measurement. In S13, the calculator 45 obtains a route loss value that corresponds to a measured port from the memory 44. In the example of FIG. 10, the calculator 45 obtains a route loss value that corresponds to the optical port P15. Here, the route loss value that corresponds to the optical port P15 is extracted from a table that corresponds to a parameter specifying an operational state of the wavelength selective switch 33. In S14, the calculator 45 adds the route loss value obtained in S13 to a reception power value obtained in S12, so as to calculate a reception power of the monitor light at the measured port. Then, in S15, the calculator 45 reports a result of the calculation to the controller 6.

In the example described above, as illustrated in FIGS. 9A and 9B, a route loss is measured in advance for a parameter that represents an operational state of the wavelength selective switch 32, 33. Then, a corresponding pass loss value is selected according to the operational state of the wavelength selective switch 32, 33. However, the embodiments of the present invention are not limited to this configuration. For example, when a correspondence relationship between the parameter that represents an operational state of the wavelength selective switch 32, 33 and an attenuation amount in the wavelength selective switch 32, 33 is known, a route loss is measured for a certain parameter (for example, a parameter that minimizes the attenuation amount). Then, when the calculator 45 calculates a power of monitor light at output/input ports, the calculator 45 may correct a route loss value stored in the memory 44 according to the parameter that has actually been set for the wavelength selective switch 32, 33.

In the example described above, a WDM optical signal received from a network and monitor light generated by the monitor light transceiver 31 are input to different ports (Q1 and Q0) of the wavelength selective switch 32, but the embodiments of the present invention are not limited to this configuration. In other words, for example, the received WDM optical signal and the monitor light may be combined by an optical coupler so as to be input to the same port of the wavelength selective switch 32.

Another Embodiment

In the embodiment described above, the controller 6 collects information indicating a power of monitor light from each unit (the wavelength selective switch unit 2 and the multicast switch unit 4), and checks an optical connection between units according to the collected information. On the other hand, in an embodiment below, the wavelength selective switch unit 2 checks an optical connection with a target unit.

Figure 13:
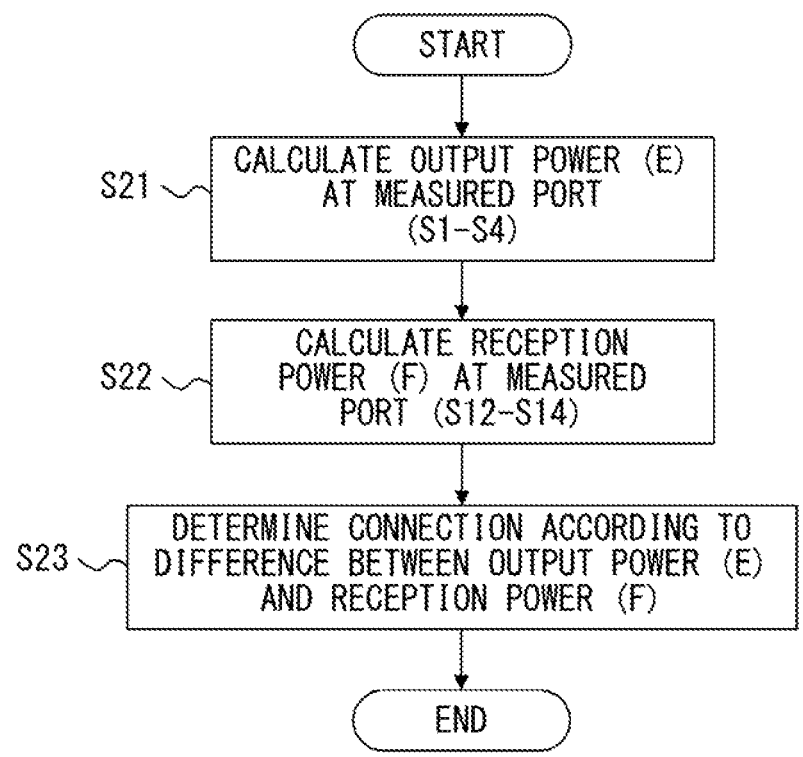
FIG. 13 is a flowchart that illustrates an example of a method for checking a connection between units according to another embodiment.

FIG. 13 is a flowchart that illustrates an example of a method for checking a connection between units according to another embodiment. Processing in this flowchart is also performed, for example, when a connection checking instruction that specifies a target unit is given from the controller 6 to the wavelength selective switch unit 2.

The process of S21 is substantially the same as the processes of S1-S4 illustrated in FIG. 11. In other words, the calculator 45 calculates an output power of monitor light at a measured port. The process of S22 is substantially the same as the processes of S12-14 illustrated in FIG. 12. In other words, the calculator 45 calculates a reception power of the monitor light at a measured port. In the example of FIG. 10, an output power of monitor light at the optical port P5 and a reception power of the monitor light at the optical port P15 are calculated in S21 and S22.

In S23, according to a difference between the output power obtained in S21 and the reception power obtained in S22, the calculator 45 determines whether an optical connection between the wavelength selective switch unit 2 and a target unit is normal. Specifically, when the difference is smaller than the specified threshold, the calculator 45 determines that the optical connection between the wavelength selective switch unit 2 and the target unit is normal. Then, the calculator 45 reports a result of the determination to the controller 6.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission device that transmits an optical signal in a specified wavelength band, the optical transmission device comprising:
   a receiver configured to receive the optical signal;

a monitor light unit configured to output monitor light of a wavelength allocated outside of the specified wavelength band;
a wavelength selective switch configured to output the optical signal via a first port and to output the monitor light via a second port; and
a memory configured to store information that indicates an optical power loss of a route through which the monitor light is transmitted.

2. An optical transmission device comprising:
a wavelength selective switch unit configured to process a wavelength division multiplexed optical signal allocated in a specified wavelength band;
a storage; and
a processor, wherein
the wavelength selective switch unit includes:
an input port to which the wavelength division multiplexed optical signal is input;
a plurality of output ports;
a monitor light generator that generates monitor light of a wavelength allocated outside of the specified wavelength band; and
a wavelength selective switch that guides an optical signal selected from the wavelength division multiplexed optical signal to a first output port among the plurality of output ports and guides the monitor light to a second output port among the plurality of output ports, and wherein
the storage stores power loss information that indicates an optical power loss of a route from the monitor light generator to the second output port, and
the processor calculates an output power of the monitor light at the second output port using a power of the monitor light output from the monitor light generator and the power loss information stored in the storage.

3. The optical transmission device according to claim 2, wherein
the processor subtracts the optical power loss indicated by the power loss information from the power of the monitor light output from the monitor light generator, so as to calculate the output power of the monitor light at the second output port.

4. The optical transmission device according to claim 2, wherein
the processor corrects the optical power loss indicated by the power loss information according to an operational state of the wavelength selective switch and subtracts the corrected optical power loss from the power of the monitor light output from the monitor light generator, so as to calculate the output power of the monitor light at the second output port.

5. An optical transmission device comprising:
a wavelength selective switch unit configured to process a wavelength division multiplexed optical signal allocated in a specified wavelength band;
a storage; and
a processor, wherein
the wavelength selective switch unit includes:
a plurality of input ports;
an output port;
a power measuring unit that measures a reception power of monitor light of a wavelength allocated outside of the specified wavelength band; and
a wavelength selective switch that guides an optical signal of a wavelength allocated within the specified wavelength band and received via a first input port among the plurality of input ports to the output port, and guides the monitor light received via a second input port among the plurality of input ports to the power measuring unit, and wherein
the storage stores power loss information that indicates an optical power loss of a route from the second input port to the power measuring unit, and
the processor calculates a reception power of the monitor light at the second input port using a power of the monitor light that is measured by the power measuring unit and the power loss information stored in the storage.

6. The optical transmission device according to claim 5, wherein
the processor adds the optical power loss indicated by the power loss information to the reception power of the monitor light that is measured by the power measuring unit, so as to calculate the reception power of the monitor light at the second input port.

7. The optical transmission device according to claim 5, wherein
the processor corrects the optical power loss indicated by the power loss information according to an operational state of the wavelength selective switch and adds the corrected optical power loss to the reception power of the monitor light that is measured by the power measuring unit, so as to calculate the reception power of the monitor light at the second input port.

8. A method for checking an optical connection in an optical transmission device that includes a wavelength selective switch unit configured to process a wavelength division multiplexed optical signal allocated in a specified wavelength band, the method comprising:
generating monitor light of a wavelength allocated outside of the specified wavelength band using a light source;
controlling a wavelength selective switch implemented in the wavelength selective switch unit to guide an optical signal selected from the wavelength division multiplexed optical signal to a first output port among a plurality of output ports of the wavelength selective switch unit and to guide the monitor light to a second output port among the plurality of output ports;
measuring a power of the monitor light output from the light source;
obtaining, from a storage, power loss information that indicates an optical power loss of a route from the light source to the second output port;
calculating an output power value of the monitor light at the second output port using the power of the monitor light output from the light source and the power loss information; and
checking an optical connection between the wavelength selective switch unit and a unit connected to the second output port using the output power value.

9. A method for checking an optical connection in an optical transmission device that includes a wavelength selective switch unit configured to process a wavelength division multiplexed optical signal allocated in a specified wavelength band, the method comprising:
controlling a wavelength selective switch implemented in the wavelength selective switch unit to guide an optical signal of a wavelength allocated within the specified wavelength band to an output port of the wavelength selective switch unit and to guide monitor light of a wavelength allocated outside of the specified wavelength band to a photo detector, wherein the optical signal is received via a first input port among a plurality of input ports of the wavelength selective switch unit and the monitor light is received via a second input port among the plurality of input ports;

measuring a power of the monitor light using the photo detector;

obtaining, from a storage, power loss information that indicates an optical power loss of a route from the second input port to the photo detector;

calculating a reception power value of the monitor light at the second input port using the power of the monitor light that is measured by the photo detector and the power loss information; and checking an optical connection between the wavelength selective switch unit and a unit connected to the second input port using the reception power value.

* * * * *